US007808951B2

(12) United States Patent  
Choi et al.

(10) Patent No.: US 7,808,951 B2  
(45) Date of Patent: Oct. 5, 2010

(54) METHOD AND APPARATUS FOR HANDOVER OF WIRELESS COMMUNICATION BETWEEN NETWORKS

(75) Inventors: Hyung-Nam Choi, Hamburg (DE); Maik Bienas, Hannover (DE); Michael Benkert, Hohenassel (DE); Michael Eckert, Braunschweig (DE)

(73) Assignee: Infineon Technologies AG, Munich (DE)

( * ) Notice: Subject to any disclaimer, the term of this patent is extended or adjusted under 35 U.S.C. 154(b) by 914 days.

(21) Appl. No.: 11/481,308

(22) Filed: Jul. 5, 2006

(65) Prior Publication Data

US 2008/0008127 A1  Jan. 10, 2008

(51) Int. Cl.  
*H04W 4/00* (2009.01)

(52) U.S. Cl. .................................. 370/331; 370/338

(58) Field of Classification Search .................. None  
See application file for complete search history.

(56) References Cited

U.S. PATENT DOCUMENTS

| | | | |
|---|---|---|---|
| 3,811,015 A | 5/1974 | Beth et al. ............... 179/18 BG |
| 5,420,863 A | 5/1995 | Taketsugu et al. .......... 370/95.3 |
| 5,438,565 A | 8/1995 | Hemmady et al. ............ 370/60 |
| 5,553,239 A * | 9/1996 | Heath et al. ..................... 726/2 |
| 5,572,528 A | 11/1996 | Shuen ...................... 370/85.13 |
| 5,721,762 A | 2/1998 | Sood ........................... 379/59 |
| 6,160,804 A | 12/2000 | Ahmed et al. ............... 370/349 |
| 6,256,300 B1 | 7/2001 | Ahmed et al. ............... 370/331 |
| 6,256,501 B1 | 7/2001 | Tokuyama et al. .......... 455/442 |
| 6,351,642 B1 | 2/2002 | Corbett et al. .............. 455/442 |
| 6,556,820 B1 | 4/2003 | Le et al. ..................... 455/411 |
| 6,584,098 B1 | 6/2003 | Dutnall ....................... 370/354 |
| 6,631,263 B1 | 10/2003 | Corkery ..................... 455/436 |
| 6,690,659 B1 | 2/2004 | Ahmed et al. ............... 370/328 |
| 6,690,933 B1 | 2/2004 | Chapman, Jr. et al. ... 455/414.1 |
| 6,704,567 B1 | 3/2004 | Chapman, Jr. et al. ... 455/422.1 |
| 6,735,202 B1 | 5/2004 | Ahmed et al. ............... 370/392 |
| 6,747,961 B1 | 6/2004 | Ahmed et al. ............... 370/328 |

(Continued)

FOREIGN PATENT DOCUMENTS

WO  WO 98/12839  3/1998

(Continued)

OTHER PUBLICATIONS

Mobile WiMAX—Part II: A Comparative Analysis, May 2006 WiMAX Forum, available at http://www.wimaxforum.org/news/downloads/Mobile_WiMAX_Part2_Comparative_Analysis.pdf.

(Continued)

*Primary Examiner*—Jayanti K Patel  
*Assistant Examiner*—Anthony Sol  
(74) *Attorney, Agent, or Firm*—Davidson, Davidson & Kappel, LLC (57) ABSTRACT

A method is provided for handover of a communication of a mobile communication device between a first radio access network and a second radio access network. The method comprises storing, by at least one of the communication device and an element of the first radio access network, a context of the communication device in the first radio access network, the context being useable to transfer the communication back to the first radio access network after a transferring to the second radio access network; and transferring the communication to the second radio access network.

30 Claims, 3 Drawing Sheets

U.S. PATENT DOCUMENTS

| | | | |
|---|---|---|---|
| 6,751,748 B1 | 6/2004 | Bush | 714/4 |
| 6,765,896 B1 | 7/2004 | Ahmed et al. | 370/338 |
| 6,947,398 B1 | 9/2005 | Ahmed et al. | 370/331 |
| 6,983,042 B1 | 1/2006 | Chapman, Jr. et al. | 379/201.02 |
| 7,016,667 B1 | 3/2006 | Chapman, Jr. et al. | 455/416 |
| 7,092,405 B2* | 8/2006 | Guo et al. | 370/468 |
| 2002/0193110 A1* | 12/2002 | Julka et al. | 455/432 |
| 2004/0137902 A1 | 7/2004 | Chaskar et al. | 455/436 |
| 2004/0192295 A1* | 9/2004 | Tsao et al. | 455/432.1 |
| 2005/0068982 A1* | 3/2005 | Guo et al. | 370/468 |
| 2006/0010272 A1* | 1/2006 | Solomon et al. | 710/105 |
| 2006/0084439 A1* | 4/2006 | Joshi et al. | 455/436 |
| 2006/0245408 A1* | 11/2006 | Lee et al. | 370/338 |
| 2007/0047491 A1* | 3/2007 | Dutta et al. | 370/331 |
| 2007/0160017 A1* | 7/2007 | Meier et al. | 370/338 |
| 2007/0173260 A1* | 7/2007 | Love et al. | 455/450 |
| 2009/0029703 A1* | 1/2009 | Turnbull et al. | 455/436 |

FOREIGN PATENT DOCUMENTS

| | | |
|---|---|---|
| WO | WO 03/105380 | 12/2003 |
| WO | WO 2005/096554 | 10/2005 |

OTHER PUBLICATIONS

3GPP TS 25.331, V3.5.0 (Dec. 2000), $3^{rd}$ Generation Partnership Project; Technical Specification Group Radio Access Network; RRC Protocol, Specification (Release 1999).

* cited by examiner

Figure 3 (a) – TDMA
(Prior Art)

Figure 3(b) – FDMA
(Prior Art)

Figure 3(c) – CDMA
(Prior Art)

METHOD AND APPARATUS FOR HANDOVER OF WIRELESS COMMUNICATION BETWEEN NETWORKS

TECHNICAL FIELD

The present invention relates to devices, networks and methods for implementing a handover of a communication of a mobile communication device between radio access networks.

BRIEF DESCRIPTION OF THE DRAWINGS

The present invention will be further described with reference to several embodiments, in which:

FIGS. 3(a), (b), and (c) graphically illustrate, as a function of time and frequency, resource allocations among users for TDMA, FDMA, and CDMA;

DETAILED DESCRIPTION OF THE INVENTION

In accordance with various embodiments of the present invention, continuity of communications is provided in the event of a handover between radio access networks. The handover may be, for example, a temporary handover of a voice connection from a mobile radio cell to a Wireless Local Area Network (WLAN) cell, where the voice connection is later handed back over to the WLAN cell.

In accordance with an embodiment of the present invention, a method is provided for handover of a communication of a communication device between a first radio access network and a second radio access network. The method includes storing, by at least one of the communication device and an element of the first radio access network, a context of the communication device in the first radio access network. The context is useable to transfer the communication back to the first radio access network after a transferring to a second radio access network. The communication is then transferred to the second radio access network.

In accordance with another embodiment of the present invention, a communication device is provided which includes a memory and a controller. The memory is configured to store a context of the communication device in a first radio access network, the context being useable to transfer a communication of the communication device in the first radio access network back to the first radio access network after a transferring to a second radio access network. The controller is configured to transfer the communication to the second radio access network.

In accordance with yet another embodiment of the present invention, a radio access network is provided which includes a memory and a controller. The memory is configured to store a context of a communication device in the radio access network, the context being useable to transfer a communication of the communication in the radio access network back to the radio access network after a transferring to a second radio access network. The controller is configured to transfer the communication to the second radio access network.

Mobile communications devices may roam between different radio access networks, even during ongoing communications or communications services.

In today's $2^{nd}$ generation cellular mobile networks (e.g., Global System for Mobile Communications (GSM)) or $3^{rd}$ generation mobile networks (e.g., Universal Mobile Telecommunications System (UMTS)), network operators offer their customers a multitude of services. In addition to basic services, such as voice telephony, SMS (Short Message Service) and Multimedia Messaging Service (MMS), the services offered also include video services and IP-based packet data services.

In view of the success of Digital Subscriber Line (DSL) in the fixed network segment, a trend in mobile communications is toward high-rate mobile communications systems that are optimized for IP applications (e.g., Voice-over-IP (VoIP)). In this connection, the Third Generation Partnership Project (3GPP) standardization committees are currently working to further develop UMTS into a mobile communications system that is optimized for packet data transmission by improving system capacity and spectral efficiency. These efforts are conducted by 3GPP under the general designation of "LTE" (Long Term Evolution) and seek to significantly increase the maximum net transfer rates in the future: up to 100 Mbps in the downlink and 50 Mbps in the uplink.

In order to improve transmission over the air interface, new multiple access methods, new channel structures, methods for optimized radio resources control, and new network architectures are being investigated. With regard to new multiple access methods, Single Carrier Frequency Division Multiple Access (SC-FDMA) and Orthogonal Frequency Division Multiple Access (OFDMA) in combination with Time Division Multiple Access (TDMA) are potential candidates for the uplink.

Another trend is the further linkage (in terms of roaming, handover) between cellular mobile communications systems and IP-based broadband access networks, such as Wireless Local Area Network (WLAN) according to IEEE 802.11 or Bluetooth. This will allow service providers to offer customers using dual-mode terminals services that can be made continuously available even when roaming between different networks.

As such, it is desirable to provide applications to ensure the continuity of a voice connection in the event of a temporary handover from a mobile radio cell to a WLAN cell and back again. Such a handover may occur, for example, in the following three cases:

1) A mobile radio cell is currently overloaded. In order to temporarily reduce the load, the mobile network decides to continue the voice connection in a neighboring WLAN cell in whose coverage area the UE ("User Equipment") is currently located. When the traffic load in the mobile radio cell has decreased, the voice connection can be continued in the mobile radio cell.
2) A user is making a call within a mobile radio cell and moves into the coverage area of a WLAN cell. The call is switched to WLAN, either manually by the user or automatically by the UE (according to the settings made by the user). When the user moves out of the coverage area of the WLAN cell, the call is continued in the mobile network.

3) A user is making a call within a mobile radio cell and is at the same time located in the coverage area of a WLAN cell. During the call, the user leaves the coverage area of the mobile radio cell (for example, the user enters a building where reception of the mobile radio cell is no longer possible), so that only the WLAN cell can provide coverage. In order to continue the call, it is handed over to the WLAN.

The above application cases can be implemented using a technology called UMA (Unlicensed Mobile Access), which allows users to access GSM and GPRS services via WLAN or Bluetooth. However, UMA does not support the current UMTS, or the planned future evolution to UMTS discussed above (collectively referred to herein as "LTE-UMTS").

In accordance with the various embodiments of the present invention described herein, a method is provided for ensuring the continuity of an existing voice connection in the event of a handover between a mobile radio network, such as LTE-UMTS, and IP based broadband access networks, such as WLAN.

In accordance with one embodiment of the present invention, prior to the handover from the LTE-UMTS to a broadband access network, the UE and all LTE-UMTS network nodes (RNC and NodeBs in the vicinity of the broadband access network) store a UE context (UE identity, current location of the UE, and the last allocated resources block) which uniquely describes the connection existing between the UE and the LTE-UMTS network before the handover.

In order for the UE status in the LTE-UMTS to be maintained active after handover to a broadband access network, the UE periodically sends an uplink signal to the LTE-UMTS network: "active" to indicate that the broadband network connection is active, and "end" to indicate that the broadband network connection is terminated.

If the UE is intended to be, or wishes to be, handed over from the broadband access network back to the LTE-UMTS network, the UE signals to the LTE-UMTS network a number (e.g. one or more) of LTE-UMTS radio cells which have the highest reception qualities. The voice connection is then continued in the LTE-UMTS radio cell on the basis of the stored UE context.

Preferably, the LTE-UMTS network sends "activity cycle" information to the UE, which allows the UE to send the periodic signals in the uplink after the handover. The "activity cycle" defines the time instants at which the UE can send the signals in the uplink. Preferably, the LTE-UMTS network sends the activity cycle information to the UE prior to a handover from the LTE-UMTS to the broadband access network.

In the uplink, the LTE-UMTS reserves defined blocks of resources in the frequency and time axes. These blocks of resources are intended to be used for special uplink signaling. The positions of these reserved blocks of resources in the frequency range are to be signaled as part of system information over the BCH (Broadcast Channel) to all UEs located in the radio cell. Also, for handover purposes, the positions of these reserved blocks of resources in the frequency range are to be identical or coordinated in all cells of the LTE-UMTS network across the entire system for a defined period.

In accordance with the above-referenced embodiment of the present invention, an interface is thereby provided which supports fast and seamless handover from an IP-based broadband access network to the LTE-UMTS network, and which allows support services to be made continuously available even when roaming between different networks (in particular, UMTS).

Further details regarding preferred implementations of the above-referenced embodiment will now be discussed. It is appropriate, however, to briefly review the UMTS environment, as it exists today, and the future LTE-UMTS environments currently under consideration, to provide background information regarding environments in which embodiments of the present invention can be implemented.

A UMTS network includes three interacting domains; Core Network (CN), UMTS Terrestrial Radio Access Network (UTRAN) and User Equipment (UE). Release 6 of UMTS defines two types of transport channels for payload data transmission: (i) dedicated channels (DCH) and (ii) common/shared channels, such as the random access channel (RACH) in the uplink and the forward access channel (FACH) in the downlink. When a radio link is to be established between user equipment ("UE") and the network, the Radio Resource Control protocol layer ("RRC protocol layer") in the radio network controller ("RNC") allocates dedicated or common/shared radio resources depending on the current traffic situation in a radio cell and the quality of service ("QoS") requested by the UE.

Figure 1:
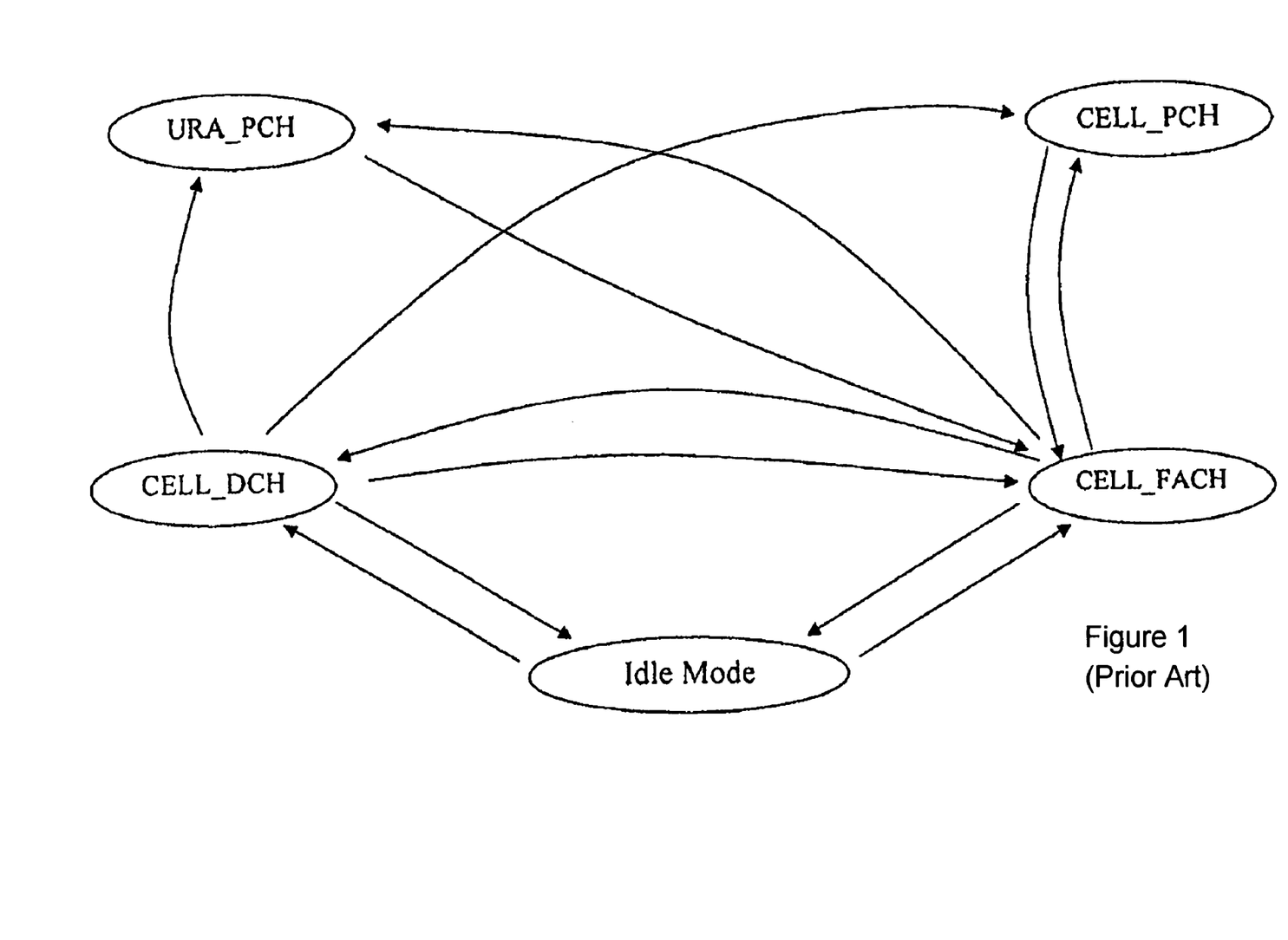
FIG. 1 illustrates RRC state transitions for the five states defined in the RRC layer of a UMTS system: Idle Mode, CELL_PCH, URA_PCH, CELL_FACH and CELL_DCH.

In order to provide efficient control of the radio resources allocated to a UE, five states are defined in the RRC layer: Idle Mode, CELL_PCH, URA_PCH, CELL_FACH and CELL_DCH. These states differ from each other in the type of allocated resources, the activity of the UE, and where (i.e., the level at which) the location of the UE is known. Details of these states are described in 3*GPP TS* 25.331: *RRC Protocol Specification*, incorporated by reference herein. The possible transitions between the different RRC states are illustrated in FIG. 1. Referring to FIG. 1:

1) In the RRC state "Idle Mode", no signaling connection and no data connection exist between UE and RNC. The UE is not known in the UMTS Terrestrial Radio Access Network ("UTRAN"). In the UMTS Core Network (CN), the UE is known only at the routing area (RA) or location area (LA) levels. In the Idle Mode, a UE can read the system information on the broadcast channel (BCH) and receive messages over the paging channel (PCH).
2) In the RRC state "CELL_PCH", only a logical signaling connection exists between UE and RNC. In this state, a UE can receive the broadcast messages from the network and listens to the common paging channel (PCH). In this state, the location of the UE is known at the cell level.
3) The RRC state "URA_PCH" is similar to CELL_PCH, except that the network only knows the group of cells (URA=UTRAN Registration Area) in which the user equipment is located.
4) In the RRC state "CELL_FACH", a signaling and data connection exists between UE and RNC. In this state, the UE is allocated common resources to be shared with other UEs, such as RACH in the uplink and FACH in the downlink. In this state, the location of the UE is known at the cell level.
5) In the RRC state "CELL_DCH", a signaling and data connection exists between UE and RNC. In this state, the UE is allocated dedicated resources, and the location of the UE is known at the cell level.

Within an existing radio link, the radio resources configured for a UE are dynamically adapted by the RNC according to the particular traffic load in the radio cell and the activity of the UE. For example, if a UE in the state CELL_DCH currently receives or transmits only a small amount of data over the dedicated resources, the RNC may cause the UE to change to CELL_FACH by explicit signaling at the RRC level. In this case, the dedicated radio link is released, and in the new state CELL_FACH, packet data transmission is continued over the common resources. If the UE activity increases again and if the particular traffic load in the radio cell allows for it, a new dedicated radio link may be established.

Figure 2:
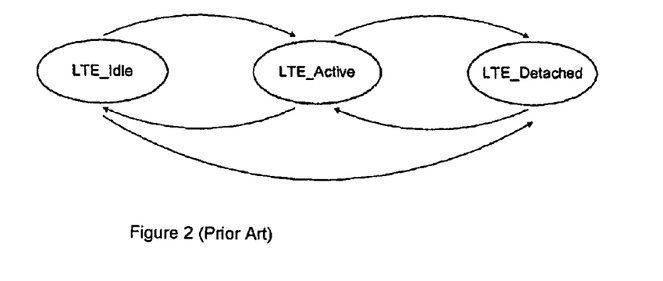
FIG. 2 shows illustrates RRC state transitions according to an evolved LTE-UMTS system, including only three states: LTE_Idle, LTE_Active, and LTE_Detached.

In connection with the further development of UMTS into a mobile communications system that is optimized for packet data transmission, new channel structures and methods for optimized radio resources control are being investigated, among other things, for LTE-UTMS. That is, in the future, payload data transmission may take place only over common (i.e., shared) transport channels, and the number of RRC states may be reduced. FIG. 2 shows a candidate radio resources control with only 3 RRC states, LTE_Idle, LTE_Active, and LTE_Detached:

1) The RRC state "LTE_Detached" is the state which the UE is in immediately after being turned on. In this state, no signaling or data connection exists between UE and network. Moreover, the UE is not known in the network, but is able to read the system information on the broadcast channel (BCH).
2) In the RRC state "LTE_Active", a signaling and data connection exists between UE and network. In this state, the UE is allocated common (i.e., shared) resources, and the location of the UE is known at the cell level.
3) In the RRC state "LTE_Idle", only a signaling connection exists between UE and network. In this state, a UE can read the system information on the broadcast channel (BCH) and receive the paging channel (PCH). Moreover, the network knows the location of the UE at the cell group level.

The current UMTS standard release 6 allows net transfer rates of 14 Mbps in the downlink and 2 Mbps in the uplink. The radio access technologies specified are FDD (Frequency Division Duplex) and TDD (Time Division Duplex), and the multiple access method is based on CDMA (Code Division Multiple Access).

With a view to the further development of UMTS into a mobile communications system that is optimized for packet data transmission, new multiple access methods are also being investigated for inclusion in LTE-UMTS. SC-FDMA (Single Carrier Frequency Division Multiple Access) and OFDMA (Orthogonal Frequency Division Multiple Access) in combination with TDMA (Time Division Multiple Access) are potential candidates for the uplink. The task of the multiple access method is to control user access to the mobile radio channel, preventing the users from interfering with each other.

Figure 3:
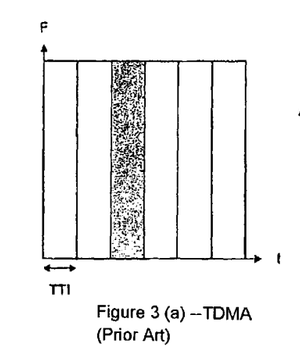
Figure 3B:
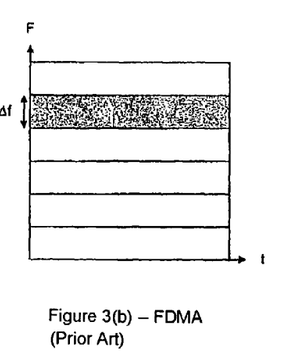
Figure 3C:
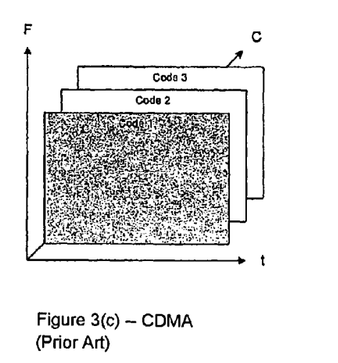

FIGS. 3(*a*), 3(*b*), and 3(*c*) graphically illustrate three known multiple access methods: TDMA, FDMA and CDMA, respectively, wherein "F" denotes the frequency axis, and "t" denotes the time axis.

Referring to FIG. 3(*a*), in TDMA (Time Division Multiple Access), each user has available the entire frequency band but only a defined transmission time interval (TTI) for transmission. During a TTI, only one transmitter is active. In SC-FDMA (Single Carrier Frequency Division Multiple Access), illustrated in FIG. 3(*b*), each user has available the whole time period but only a defined (narrow) frequency bandwidth from the total bandwidth for transmission. In each of these frequency bands, only one user can be active at a time. Referring to FIG. 3(*c*), in CDMA (Code Division Multiple Access), each user has available the whole time period and the entire frequency band for transmission. However, in order to prevent interference between the signals from the different transmitters, each user is assigned a binary code pattern. These binary code pattern are independent (i.e. orthogonal) from each other and are used to encode or spread the user signal in a user-specific manner.

Orthogonal Frequency Division Multiple Access (OFDMA) is a special case of FDMA and constitutes a multicarrier technique in which the signal bandwidth B is divided into M orthogonal subbands. In this manner, M frequency carriers having a bandwidth of $\Delta f=B/M$ are obtained instead of one frequency carrier having a large bandwidth. Thus, in OFDMA, the data stream to be transmitted is distributed over a plurality of subcarriers, and transmitted in parallel at a correspondingly reduced data rate. In OFDMA, the whole time period and a defined number of subcarriers can be made available to a user for transmission.

Figure 4:
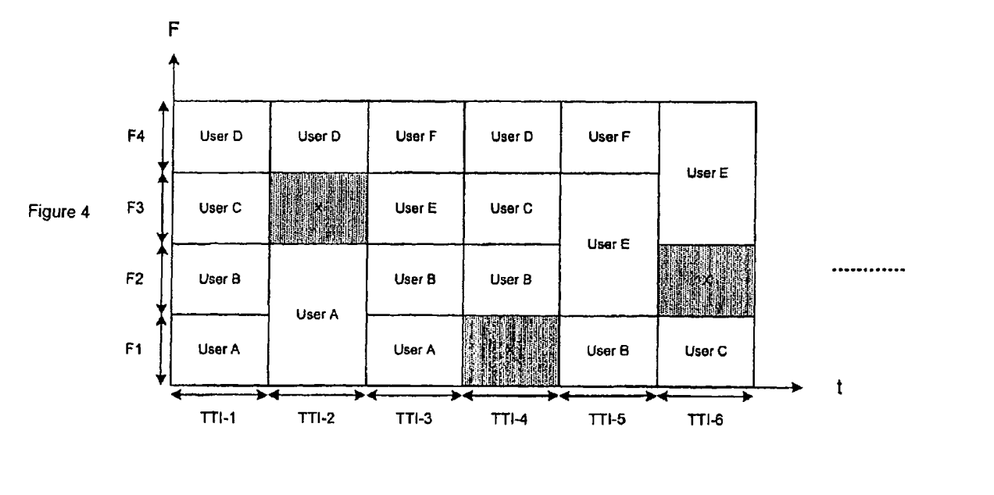
FIG. 4 graphically illustrates, as a function of time and frequency, resource allocations among users A-E in the uplink in SC-FDMA/OFDMA in combination with TDMA.

In accordance with an embodiment of the present invention, in a LTE-UMTS uplink multiple access method based on SC-FDMA/TDMA or OFDMA/TDMA, the network assigns to a user, a defined frequency bandwidth and transmission time interval for data transmission in the uplink. An example of this is illustrated in FIG. 4, where the network dynamically assigns different blocks of resources to six users (A through F) at the transmission time intervals (TTI-1 through TTI-6). Furthermore, the network can reserve defined blocks of resources (plotted as an X in shaded areas in FIG. 4) for specific tasks, for example, to transmit signaling information.

In accordance with one exemplary embodiment of the present invention, an LTE UMTS network is assumed which uses a multiple access method in the uplink based on SC-FDMA or OFDMA in combination with TDMA, and has a channel structure in which only common (i.e., shared) transport channels are used for payload data transmission, and which further has an optimized radio resources control with a reduced number of RRC states. It is further assumed that the LTE-UMTS networks and IP-based broadband access networks, such as WLAN or Bluetooth, support handover between the different networks.

In accordance with this embodiment of the present invention, a method and system is provided for ensuring the continuity of an existing voice connection in the event of a handover between an LTE-UMTS system and IP based broadband access networks. In accordance with this embodiment, prior to the handover from the LTE-UMTS to a broadband access network, the UE and all LTE-UMTS network nodes (RNC and NodeBs in the vicinity of the broadband access network) store a UE context including the following parameters, which uniquely describe the connection existing between the UE and the LTE-UMTS network before the handover:

1) UE identity;
2) current location of the UE (=radio cell identity); and
3) the last allocated resources block (=frequency bandwidth).

After handover from LTE-UMTS to a broadband access network, the network switches the UE from LTE_Active to LTE_Idle at the RRC level. As explained above, in the LTE_Idle state, the UE can be paged by the network over the paging channel (PCH).

In order for the UE status in the LTE-UMTS to be maintained active after handover to a broadband access network, the UE must periodically send an uplink signal to the LTE-UMTS network. In accordance with this embodiment of the present invention, the following signals are defined:

1) "active" to indicate that the voice connection is continued in the broadband access network. As long as this signal is sent, the UE context remains stored. Otherwise, i.e., if this signal fails to appear after a defined period of time, the UE context may be deleted.

2) "end" to indicate that the voice connection has been terminated in the broadband access network. After this signal is sent, the UE and all LTE-UMTS network nodes delete the UE context.

If the UE is to be, or wishes to be, handed over from the broadband access network back to the LTE-UMTS network, the UE sends a signal to the LTE-UMTS network, identifying one or more LTE-UMTS radio cells having a specified reception quality. In this regard, the specified reception quality could be the highest reception quality, the highest three reception qualities, all radio cells meeting a minimum reception quality, etc. In any event, based on this information, the network selects a radio cell to which the voice connection should or can be handed over to. The voice connection is then handed over (continued) on the selected radio cell based on stored UE context.

Prior to a hand-over from LTE-UTMS to the broadband access network, the LTE-UMTS network signals to the UE an "activity cycle", which allows the UE to send the periodic signals in the uplink. This "activity cycle" defines the time instants at which the UE can send the signals in the uplink while the voice connection is handed-over to the broadband access network (i.e., while the UE is in handover mode). These instants can be calculated according to the following formula:

$$TTI\_N = (N + M\_Offset) \bmod P\_HO,$$

where N is a continuous integer, M_Offset is a fixed time offset value, and where P_HO indicates the period for UEs in handover mode.

The values for M_Offset and P_HO are suitably selected by the network according to the number of UEs in handover mode (i.e., in a UE-specific manner) and the coverage situation in the second radio access network.

In accordance with the above embodiment of the present invention, it is assumed that for each UE in an LTE-UMTS network, a period P is also configured with a specific M_Offset_P, which is used for regular uplink signaling: i.e. UE uplink signaling when the voice communication has not been handed off to the broadband access network. In this regard, P≠P_HO and M_Offset_P≠M_Offset, such that "regular uplink signaling" UEs in the LTE-UMTS network and UEs in handover mode will not interfere with each other.

In the uplink, the LTE-UMTS reserves defined blocks of resources in the frequency and time axes. These blocks of resources are intended to be used for special uplink signaling and need not always be statically in the same frequency band. Rather, they can be combined with a frequency hopping method to reduce frequency-selective interference in the mobile radio channel. This means that the reserved blocks of resources can change from TTI to TTI between different frequency bands according to a defined rule. In accordance with the present invention, the positions of these reserved blocks of resources in the frequency range are signaled as part of system information over the BCH to all UEs located in the radio cell. Also, for handover purposes, the positions of these reserved blocks of resources in the frequency range are to be identical or coordinated in all cells of the LTE-UMTS network across the entire system for the period P_HO.

An exemplary system in accordance with the present invention will now be discussed. In this example, the IP-based broadband access network is a WLAN system.

Figure 5:
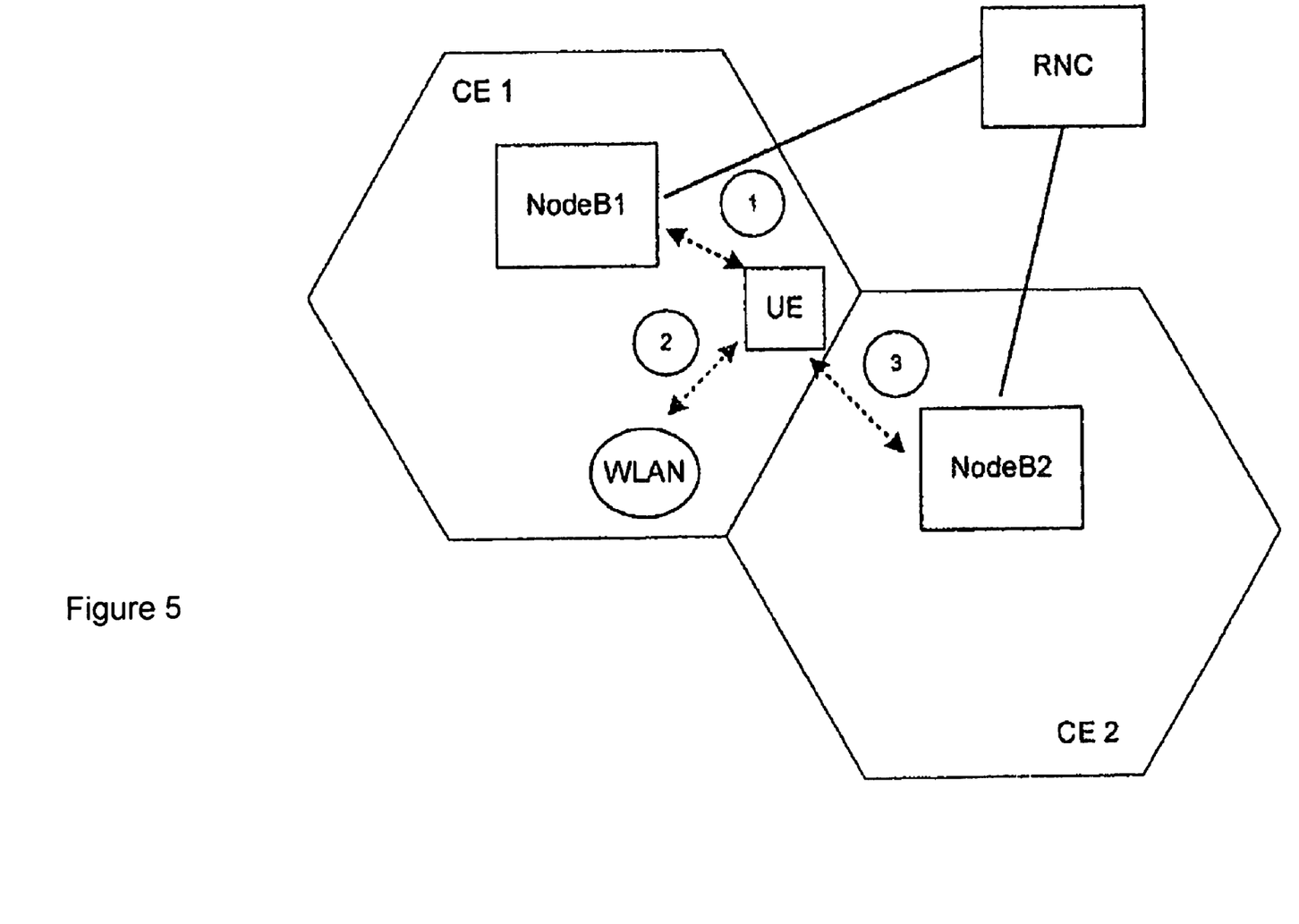
FIG. 5 illustrates a system including a user equipment (UE), a WLAN, a Radio Network Controller (RNC), and two nodes NodeB1 and NodeB2 generating radio cells CE1 and CE2, respectively.

In this exemplary system, an LTE UMTS network is provided which uses a multiple access method in the uplink based on SC-FDMA in combination with TDMA, and has a new channel structure in which only common (i.e., shared) transport channels are used for payload data transmission, and which further has an optimized radio resources control with a reduced number of RRC states, e.g. three states, as shown in FIG. 2. Further, to simplify the presentation an LTE UMTS network is assumed as illustrated in FIG. 5 comprising a Radio Network Controller (RNC), in which the RRC protocol is located, and two nodes NodeB1 and NodeB2 generating radio cells CE1 and CE2, respectively. It should be understood that the example is also valid in case the RRC protocol would be located in the nodes NodeB1 and Node2, respectively.

In the uplink, the LTE-UMTS has defined blocks of resources reserved in the frequency and time axes. These blocks of resources are intended to be used for special uplink signaling (plotted as an X in shaded areas in FIG. 4). In this example, these blocks of resources are not always statically in the same frequency band. Rather, they are in a different frequency band after every second TTI, i.e., in TTI-2, the resources block is in frequency band F3, in TTI-4, it is in frequency band F1, in TTI-6, it is in frequency band F2, etc. The positions of these reserved blocks of resources in the frequency range are signaled as part of system information over the BCH to all UEs located in the radio cell. Also, for handover purposes, the positions of these reserved blocks of resources in the frequency range are identical in all cells of the LTE-UMTS network across the entire system for the period P_HO. A transmission time interval of TTI=2 ms is assumed.

A network-triggered handover from an LTE-UMTS cell to a WLAN cell and back to an LTE-UMTS cell will now be described for this exemplary system with reference to user D of FIG. 4.

Referring to FIG. 5, user D of FIG. 4 is associated with a dual mode UE ("UE" in FIG. 5). In radio cell CE1, generated by NodeB1, a voice connection (denoted by 1) exists between the dual mode UE and the RNC. Due to a current overload in radio cell CE1, the RNC decides to temporarily continue the voice connection in the neighboring WLAN cell in whose coverage area the UE is currently located.

Via an RRC message in the downlink, the RNC signals the UE to perform the handover to the WLAN cell at a defined time instant x. Prior to the handover to the WLAN, the UE and the LTE-UMTS network nodes RNC, NodeB1 and NodeB2 store the following UE context:
  (1) UE identity,
  (2) current location of the UE=CE1 (as shown in FIG. 5); and
  (3) the last allocated resources block=frequency band F4 (as shown in FIG. 4)

Furthermore, the LTE-UMTS network signals to the UE the following parameters for calculating its "activity cycle", which allows the UE to send the periodic signals in the uplink after the handover:
  M_Offset=4,
  P_HO=256.

Thus, according to the formula TTI_N=(N+M_Offset) mod P_HO, the UE can send its uplink signals to the LTE-UMTS networks within a period of 256 TTIs at the instants TTI_N=4, 8, 12, etc.

The UE performs the handover to the WLAN at the defined instant x and continues the call in the WLAN (denoted by 2 in FIG. 4). After the handover to the WLAN, the LTE-UMTS network switches the UE from LTE_Active to LTE_Idle at the RRC level. As explained above, the UE can be paged by the network over the paging channel (PCH) in the LTE_Idle state.

As long as the voice connection in the WLAN exists, the UE sends an uplink signal "active" to the LTE-UMTS network at the defined instants according to its activity cycle in order to indicate that the voice connection is continued in the WLAN. As long as this signal is sent, the UE context remains stored in the RNC, NodeB1 and NodeB2.

After some time, the traffic load in radio cell CE1 decreases, so that the RNC decides to continue the voice connection in the LTE UMTS. Via NodeB1, the RNC notifies the UE of the decision to perform the handover back to the LTE UMTS at a defined time instant y.

Prior to expiration of handover instant y, for purposes of confirmation, the UE sends an uplink signal specifying radio cell CE2 in order to indicate that this radio cell is detected to have the highest reception quality. The RNC receives this signal and, based on this information and the stored UE context, decides to continue the voice connection in cell CE2, which is generated by NodeB2. The RNC notifies NodeB2 that the voice communication will be continued in cell CE2 and, based on the UE context, the call is continued in the LTE-UMTS network after handover to radio cell CE2 (denoted by 3 in FIG. 5).

As explained above, as long as the voice connection is continuing in the WLAN, the UE sends an uplink signal "ACTIVE" to the LTE-UMTS network. However, once the call ends in the WLAN, the UE sends an "end" signal in the uplink according to its activity cycle in order to indicate that the voice connection has been terminated in the WLAN. After that, the UE, RNC, NodeB1 and NodeB2 delete the stored UE context.

An exemplary network-triggered handover from an LTE-UMTS cell to a WLAN cell will now be described. In this example, user D makes a call in an LTE-UMTS cell and leaves the coverage area of the LTE-UMTS cell during the call as he/she enters a building where, due to the construction of the building, there is no LTE-UMTS network coverage, but in which coverage by the WLAN cell is still available.

Via an RRC message in the downlink, the RNC signals the UE to perform the handover to the WLAN cell at a defined instant x. Prior to the handover to the WLAN, the UE and the LTE-UMTS network nodes RNC, NodeB1 and NodeB2 store the following UE context:
1) UE identity,
2) current location of the UE=CE1,
3) the last allocated resources block=frequency band F4.

Furthermore, the LTE-UMTS network signals to the UE the following parameters for calculating its "activity cycle":
M_Offset=256,
P_HO=2056.

These higher parameter values for M_Offset and P_HO allow the network to take into account that, temporarily, no uplink connection exists to the LTE-UMTS network after handover to the WLAN cell.

The UE performs the handover to the WLAN at the defined instant x and continues the call in the WLAN. After some time, the user leaves the building and moves back into the coverage area of the LTE-UMTS cell while the call is continued in the WLAN. Then, the UE sends an "active" signal to the LTE-UMTS network at the next possible instant according to its activity cycle. The network receives this signal and decides whether to continue the call in the WLAN or in the LTE-UMTS.

In the preceding specification, the invention has been described with reference to specific exemplary embodiments and examples thereof. It will, however, be evident that various modifications and changes may be made thereto without departing from the broader spirit and scope of the invention as set forth in the claims that follow. For example, although the specific exemplary embodiments of the present invention are described in the context of certain proposed LTE-UMTS systems, it should be understood that the present invention is in no way limited to that proposed environment, or to UMTS in general. The specification and drawings are accordingly to be regarded in an illustrative manner rather than a restrictive sense.

What is claimed is:

1. A method for handover of a communication of a mobile communication device between a first radio access network and a second radio access network, the method comprising:
    storing, by at least one of the communication device and an element of the first radio access network, a context of the communication device in the first radio access network, the context being useable to transfer the communication back to the first radio access network after a transferring to the second radio access network;
    transferring the communication to the second radio access network;
    before the transferring, signaling, by the first radio access network, an activity cycle to the communication device, the activity cycle defining times when the communication device can send uplink signals;
    after the transferring, periodically sending, by the communication device, an uplink signal to the first radio access network, the uplink signal indicating a status of the communication in the second radio access network; and
    after the transferring, switching a radio resource control state of the communication device in the first radio access network from an active state to an idle state, the communication device being pageable while in the idle state by the first radio access network.

2. The method as recited in claim 1 wherein the active state is LTE_Active and the idle state is LTE_Idle.

3. The method as recited in claim 1 wherein the status of the communication in the second radio access network includes at least one of an active status indicating that the communication has been continued in the second radio access network and an end status indicating that the communication has been terminated in the second radio access network.

4. The method as recited in claim 3 further comprising deleting the context when the uplink signal is not received by the first radio access network after a predefined period of time or when the end status is received by the first radio access network.

5. The method as recited in claim 1 further comprising calculating the activity cycle based on a number of other communication devices handed over to the second radio access network.

6. The method as recited in claim 5 further comprising calculating the activity cycle using the formula $$TTI\_N = (N + M\_Offset) \bmod P\_HO$$

where N is a continuous integer, M_Offset is a selected time offset value, and P_HO indicates a selected time period, at least one of M_Offset and P_HO being selected based on the number of other communication devices handed over to the second radio access network.

7. The method as recited in claim 1 further comprising calculating the activity cycle based on the coverage situation in the second radio access network.

8. The method as recited in claim 7 further comprising calculating the activity cycle using the formula $$TTI\_N = (N + M\_Offset) \bmod P\_HO$$

where N is a continuous integer, M_Offset is a selected time offset value, and P_HO indicates a selected time period, at least one of M_Offset and P_HO being selected based on the number of other communication devices handed over to the second radio access network.

9. The method as recited in claim 1 further comprising reserving, by the first radio access network, defined blocks of uplink resources for uplink signals.

10. The method as recited in claim 9 wherein the defined blocks of uplink resources are resources in a frequency axis and a time axis.

11. The method as recited in claim 9 further comprising determining the defined blocks of uplink resources using a frequency hopping method.

12. The method as recited in claim 9 further comprising signaling, over a broadcast channel, positions of the reserved defined blocks of uplink resources.

13. The method as recited in claim 1 further comprising signaling to the first radio network, by the communication device, an identity of a radio cell of the first radio network, the radio cell being identified by the communication device based on a reception quality of the radio cell detected by the communication device.

14. The method as recited in claim 1 further comprising transferring the communication back to the first radio access network using the stored context.

15. The method as recited in claim 14 further comprising signaling to the first radio network, by the communication device, an identity of a radio cell of the first radio network, the radio cell being identified by the communication device based on a reception quality of the radio cell detected by the communication device, and wherein the handing over the communication back to the first radio network is performed using the identity of the radio cell signaled by the communication device.

16. The method as recited in claim 1 wherein the first radio access network is a third generation mobile network.

17. The method as recited in claim 1 wherein the second radio access network is a broadband access network.

18. The method as recited in claim 17 wherein the broadband access network is at least one of a wireless local area network and a Bluetooth network.

19. The method as recited in claim 1 wherein the context includes an identity of the communication device, a current location of the communication device, and a current resource block of the first radio access network allocated to the communication device.

20. The method as recited in claim 19 wherein the current location of the communication device includes a radio cell identity of the first radio access network and the currently allocated resources block includes a frequency bandwidth.

21. The method as recited in claim 1 wherein the first radio access network includes a plurality of nodes and the storing step includes storing the context of the communication device in each of the nodes.

22. A communication device comprising:
a memory to store a context of the communication device in a first radio access network, the context being useable to transfer a communication of the communication device in the first radio access network back to the first radio access network after a transferring to a second radio access network; and
a controller configured to transfer the communication to the second radio access network and to, after the transferring, periodically send an uplink signal to the first radio access network, the uplink signal indicating a status of the communication in the second radio access network;
the controller being configured to, before the transferring, receive an activity cycle from the first radio access network, the activity cycle defining times when the communication device can send uplink signals; and
the controller being configured to, after the transferring, switch a radio resource control state of the communication device in the first radio access network from an active state to an idle state, the communication device being pageable in the idle state by the first radio access network.

23. The communication device as recited in claim 22 wherein the controller is also configured to:
identify a radio cell of the first radio network based on a detected reception quality of the radio cell; and
signal to the first radio network an identity of the radio cell.

24. The communication device as recited in claim 22 wherein the controller is also configured to transfer the communication back to the first radio access network using the stored context.

25. The communication device as recited in claim 22 wherein the first radio access network is a third generation mobile network.

26. The communication device as recited in claim 22 wherein the second radio access network is a broadband access network.

27. A radio access network comprising:
a memory to store a context of a communication device in the radio access network, the context being useable to transfer a communication of the communication device in the radio access network back to the radio access network after a transferring to a second radio access network; and
a controller configured to transfer the communication to the second radio access network and to, after the transferring, periodically receive an uplink signal indicating a status of the communication in the second radio access network;
the controller being configured to, before the transferring, send an activity cycle to the communication device, the activity cycle defining times when the communication device can send an uplink signal; and
the controller being configured to, after the transferring, switch a radio resource control state of the communication device in the radio access network from an active state to an idle state, the communication device being pageable in the idle state by the radio access network.

28. The radio access network as recited in claim 27 wherein the controller is also configured to receive from the communication device an identity of a radio cell of the radio network, radio cell being identified by the communication device based on a reception quality of the radio cell detected by the communication device.

29. The radio access network as recited in claim 27 wherein the controller is also configured to transfer the communication back to the radio access network using the stored context.

30. The radio access network as recited in claim 27 wherein the second radio access network is a fixed broadband access network.

* * * * *